United States Patent [19]

Kirsch et al.

[11] 4,022,508
[45] May 10, 1977

[54] AIR DRAG REDUCING MEANS FOR BLUFF VEHICLES AND THE LIKE

[75] Inventors: Jeffrey W. Kirsch, La Jolla; Edward A. Day, Rancho Santa Fe, both of Calif.

[73] Assignee: Systems, Science and Software, La Jolla, Calif.

[22] Filed: Mar. 10, 1975

[21] Appl. No.: 554,751

Related U.S. Application Data

[63] Continuation-in-part of Ser. No. 456,469, April 1, 1974, abandoned.

[52] U.S. Cl. .................................. 296/1 S; 105/2 R
[51] Int. Cl.² ......................................... B62D 35/00
[58] Field of Search ........ 296/1 S, 91, 84 R, 137 J; 180/1 FV; 105/2 R, 2 A; 224/42.1 E

[56] References Cited

UNITED STATES PATENTS

| | | | |
|---|---|---|---|
| 2,028,542 | 1/1936 | Gluhareff | 296/84 R |
| 2,037,942 | 4/1936 | Stalker | 296/1 S X |
| 2,361,924 | 11/1944 | Boynton | 296/1 S |
| 2,514,695 | 7/1950 | Dempsey | 296/1 S X |
| 2,863,695 | 12/1958 | Stamm | 296/1 S |
| 3,328,074 | 6/1967 | Rossem | 296/1 S X |
| 3,814,472 | 6/1974 | Zelikovitz | 296/1 S |
| 3,866,967 | 2/1975 | Landry | 296/1 S |
| 3,934,922 | 1/1976 | MacCready | 296/91 X |

FOREIGN PATENTS OR APPLICATIONS

| | | | |
|---|---|---|---|
| 1,336,673 | 3/1962 | France | 296/1 S |
| 1,192,862 | 3/1958 | France | 296/1 S |

Primary Examiner—Robert J. Spar
Assistant Examiner—Winston H. Douglas
Attorney, Agent, or Firm—Fitch, Even, Tabin & Luedeka

[57] ABSTRACT

Means for reducing the air drag on bluff vehicles are disclosed which facilitate improved fuel mileage and reduce induced air turbulence adjacent the vehicle. In one embodiment the air drag reducing means employs an airvane member secured in spaced relation to an air flow guide element in kit form for mounting adjacent a corner edge of the bluff surface to prevent separation of air flow from the corner edge and adjacent rearward surface of the vehicle and develop a net forward thrust on the air drag reducing means. Another embodiment includes an airvane member and means for mounting it adjacent a smooth curved windward corner edge of a bluff surface on the vehicle so as to define an air flow passage through which air passes from the bluff surface in attached relation to the corner edge and adjacent rearwardly extending surface of the vehicle.

15 Claims, 9 Drawing Figures

AIR DRAG REDUCING MEANS FOR BLUFF VEHICLES AND THE LIKE

The Government has rights in this ivention pursuant to Grant No. G-142505 awarded by the National Science Foundation.

The present application is a continuation-in-part of copending application, Ser. No. 456,469, filed Apr. 1, 1974, now abandoned, and relates generally to devices for reducing air drag on vehicles.

More particularly, the present invention relates to such devices which include novel air flow control elements mountable on a bluff vehicle adjacent a windward corner edge thereof to prevent separation of air flowing around the corner edge and along the adjacent rearwardly extending surface of the vehicle and develop a net forward thrust on the air flow control elements so as to reduce air drag on the vehicle and improve fuel mileage and handling.

With the advent of super highways, commercial vehicles such as trucks and buses have maintained their importance in the transportation field and have been developed to travel at high rates of speed, often substantially exceeding 50 mph. To retain maximum load capacity, the contemporary truck and bus designs have maintained the traditional box-like or bluff vehicle design, with relatively few changes in vehicle design being incorporated to streamline the vehicles and provide improved aerodynamic characteristics.

The traditional truck and bus designs may be generally termed "bluff" vehicles in that they have relatively broad flatened front surfaces. It is known that air drag on such bluff vehicles increases as the square of the relative air speed. For large bluff vehicles, that is, vehicles having substantially large windward bluff surfaces such as trucks and buses, the air drag can exceed the rolling friction losses at speed in excess of 50 mph. The increased drag requires larger power plants which result in greater fuel consumption. The wide variety of body shapes and configurations of bluff vehicles have presented a formidable obstacle to the development of aerodynamic design criteria for reducing air drag on bluff vehicle.

Attempts have been made to streamline the designs of trailer trucks and buses and, while such designs have provided increased efficiency through reduction of air drag, they have correspondingly reduced the payloads that may be carried by the vehicles. As a consequence, the traditional box-like bluff design has maintained its influence in present day truck and bus designs.

One approach to reducing air drag on bluff vehicles, to which the present invention is directed, is the utilization of airvanes to guide or direct air flow around the corner edges of the windward bluff surface so as to substantially eliminate separation of air from the top and lateral side surfaces of the bluff vehicle and develop a net forward thrust on the air flow control elements so as to reduce the overall pressure acting on the widward surface of the bluff vehicles.

An example of an air stream control device to reduce the air drag on truck vehicles is disclosed in U.S. Pat. No. 2,863,695, dated Dec. 9, 1958, to A. F. Stamm. The air stream control kit disclosed in the Stamm patent employs means mounted on the truck cab to deflect air flow so that it impacts on the windward face of the trailer near the outer edges whereafter the impacting air is channeled by fixtures on the trailer to flow around the windward edges of the trailer. In the Stamm device, the flow deflectors on the truck cab are essential to reduce air drag on the trailer, thus adding substantially to the cost of the control kit.

In the copending application of Jeffrey W. Kirsch and Sabodh K. Garg, entitled Airvane Device for Bluff Vehicles and the Like, Ser. No. 456,470, filed Apr. 1, 1974, now abandoned, an airvane device is disclosed for use with bluff vehicles to reduce air drag on the vehicles. The airvane device disclosed in this copending application is mounted adjacent a windward corner edge of the bluff surface and has a configuration which serves to establish an air passageway with the associated outer surface of the bluff vehicle through which air is guided in a manner to prevent separation of air flow from the adjacent bluff vehicle surface and reduce air drag on the vehicle with resulting fuel economies and improved handling of the vehicle.

While the airvane device disclosed in the referenced copending application provides an improved means for reducing air drag on bluff vehicles and the like, it has been found that variations in the structural detail and exterior configurations of bluff vehicles adjacent the corner edges thereof, and particularly the forward or windward corner edges peripherally of the bluff surface, frequently require an analysis of the air flow around each such edge configuration to determine the need for special fairing that might be required to render optimum performance of the airvane device. The present invention is directed to means for reducing air drag on bluff vehicles, which means may be mounted on a bluff vehicle adjacent a windward corner edge thereof and eliminates the need for an analysis of the particular shape or configuration of the exterior surface of the vehicle adjacent the windward corner edges thereof.

The present invention also provides air drag reducing means for mounting on a bluff vehicle adjacent a windward corner edge defined by a fairing surface formed during manufacture of the vehicle and which interconnects the bluff surface to a rearwardly extending top or side surface of the vehicle.

One of the primary objects of the present invention is to provide means for reducing air drag on a bluff vehicle, which means takes the form of an air guide kit adapted for mounting adjacent one or more windward corner edges of a bluff surface on the vehicle, and wherein the kit includes an air flow guide element adapted for mounting on the bluff surface to overlie and cover any surface irregularities in the adjacent corner edge surface, the kit further including an airvane member secured to the air flow guide element in spaced relation thereto and defining therewith an air flow passage through which air from the bluff surface is caused to pass without substantial separation from the vehicle surfaces so as to reduce air drag on the vehicle.

Another object of the present invention is to provide means for reducing air drag on a bluff vehicle, one embodiment of such means taking the form of an airvane member adapted for mounting on a bluff vehicle adjacent a windward corner edge thereof defined by a smooth generally arcuate fairing surface, the airvane member serving to provide a forward net thrust on the vehicle and reduce the air pressure drag acting on the front bluff surface.

Another object of the present invention is to provide means for reducing air drag on a bluff vehicle as described wherein, in one embodiment, the air flow guide element and associated airvane member when mounted on the vehicle do not extend outwardly of an envelope defined by the planes of the upper and side surfaces of the vehicle, thus being non-protruding in nature and facilitating use with a bluff vehicle which is made substantially to the maximum height and width limitations as established by law.

Still another object of the present invention is to provide an air guide kit which is particularly adapted for releasable mounting on a cargo container to reduce air drag on the container while in transit, and which may be readily detached from the cargo container while the container is off-loaded from a highway or rail transport carrier.

A still further object of the present invention is to provide an air drag reducing means for bluff vehicles which retards separation of the air flowing over the surfaces of the vehicle downstream of the corner edges under conditions wherein a cross-wind is encountered by the bluff vehicle.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

Figure 1:
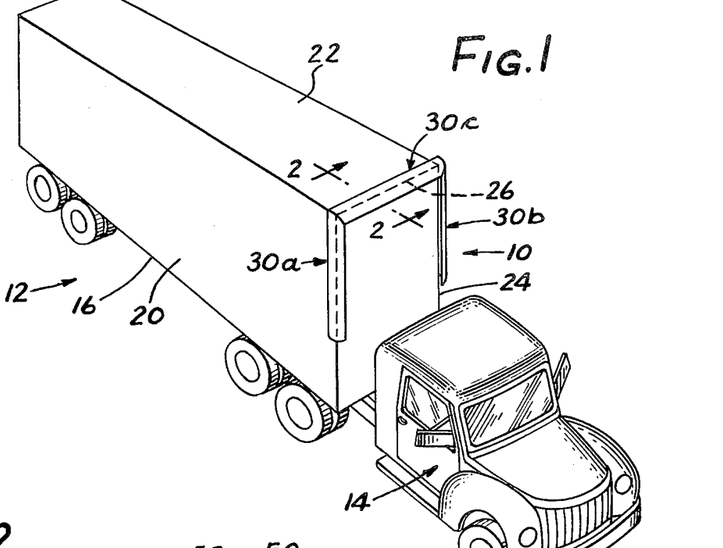
FIG. 1 is a perspective view of a bluff vehicle taking the form of a tractor-trailer, the trailer having air drag reducing means thereon in accordance with one embodiment of the present invention.
Figures 2, 3:
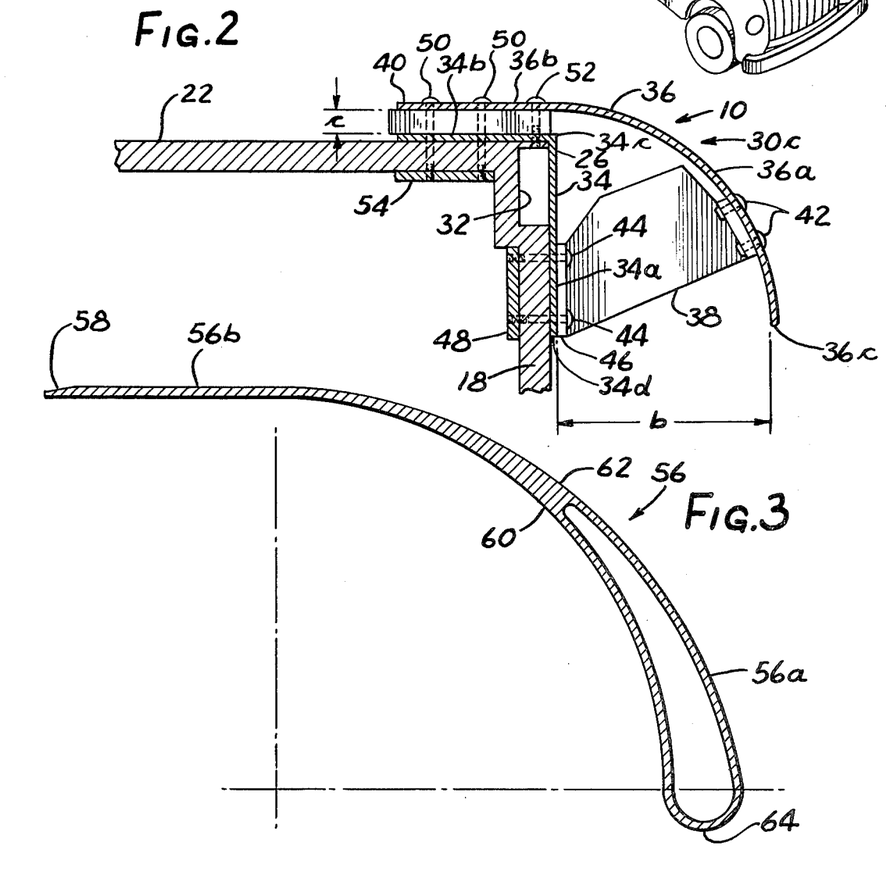
FIG. 2 is an enlarged partial transverse sectional view taken substantially along the line 2—2 of FIG. 1.
FIG. 3 is an enlarged transverse sectional view of an alternative airvane which may be employed in the air drag reducing means of FIGS. 2, 4 and 5.

Referring now to the drawings, and in particular to FIGS. 1 and 2, one embodiment of means for reducing air drag on bluff vehicles in accordance with the present invention is indicated generally at 10. The air drag reducing means 10 is shown, for purposes of illustration, in conjunction with a bluff vehicle, indicated generally at 12 in FIG. 1. The bluff vehicle 12 may comprise a tractor-trailer vehicle having a tractor 14 adapted to be connected to and provide the drive means for a trailer 16 in a known manner. As will become more apparent hereinbelow, the air drag reducing means in accordance with the present invention may be used with alternative bluff vehicles, such as buses, vans and cargo containers of generally rectangular shape which may be releasably secured to highway transporters for movement between locations where the cargo containers are off-loaded from the transporters. The main characteristic of these bluff vehicles is that they all have a relatively broad forward bluff surface which presents a substantial surface area against which air impinges when the vehicle is moved in a forward direction. The bluff surface may lie in a substantially vertical plane or may lie in a plane angularly inclined forwardly or rearwardly of vertical.

The trailer 16 has a forward generally vertically disposed bluff surface 18 which intersects longitudinally rearwardly extending lateral side sirfaces, one of which is indicated at 20, and a longitudinally rearwardly extending top surface 22. The intersection of the bluff surface 18 with the lateral side surfaces 20 establishes substantially right angle vertical or side windward corner edges 24, while the intersection of the bluff surface 18 with the top surface 22 establishes an upper horizontal transversely disposed substantially right angle windward corner edge 26.

It is known that with bluff vehicles, such as the trailer 16 of the tractor-trailer illustrated in FIG. 1, air flow impinging on the windward or bluff surface, such as the bluff surface 18 on the trailer 16, forms a stagnation point on the bluff surface. This stagnation point is generally located in the vicinity of the geometric center of the bluff surface area above the tractor roofline that is directly exposed to air or wind impingement during forward movement of the vehicle. It is not a stationary point and may take varying locations dependent upon wind direction and the exact geometry of the bluff surface. The air flow in the vicinity of the bluff surface moves generally radially outwardly from the stagnation point, with the air pressure acting on the bluff surface being of maximum magnitude at the stagnation point and decreasing in magnitude in relation to the distance from the stagnation point. It is the air pressure exerted on the bluff surface which acts to retard the motion of the vehicle in a windward direction. If the bluff vehicle has generally square corner edges, i.e. has corner edges having radii of curvature approximately four inches or less, the air flow from the bluff surface will separate from the bluff vehicle side and top surfaces and cause regions of circulatory turbulent air flow to be formed leeward or downstream from the corner edges. These turbulent air flow regions extend from the windward corners to positions at which the air flow along the longitudinal surfaces of the vehicle reattaches to the vehicle surfaces, which positions of reattachment are related to the width and height of the bluff body. The circulatory turbulent air flow regions along the longitudinal surfaces of the bluff vehicles induce swirling of dirt and other debris which inhibit visibility of adjacent vehicles. Tests have demonstrated that the air drag acting on a bluff vehicle, and the induced swirling of dirt and debris adjacent the bluff vehicle can be significantly reduced if the corner edges of the bluff vehicle are provided with means to guide the air moving off the bluff surface so as to cause the air to flow smoothly around the corner edges without separation from the adjacent vehicle surfaces In accordance with the embodiment illustrated in FIGS. 1 and 2, the air drag reducing means 10, which is herein alternatively termed air guide kit means, is mounted on the trailer 16 adjacent one or more generally square windward corner edges thereof to effect smooth flow of air passing from the stagnation area of the forward bluff surface 18 about the corner edges underlying the air guide kit means to reduce the air drag acting on the bluff vehicle. The air guide kit means 10 includes three air guide kit sections 30a, 30b, and 30c which are substantially identical in construction and mounted on the bluff vehicle such that the air guide kit sections 30a and 30b are mounted adjacent the vertical windward corner edges 24 while the air guide kit section 30c is mounted adjacent the upper horizontal windward corner edge 26. It will be understood that either one or all of the air guide kit sections 30a, 30b and 30c may be mounted on the bluff vehicle adjacent a windward corner edge thereof and will serve to reduce air drag on the bluff vehicle. Where the top and side edges of the forward bluff surface are all generally square it is preferable that three such air guide sections be mounted on the bluff vehicle in end-to-end relation as illustrated in FIG. 1 to maximize the reduction of air drag.

With particular reference to FIG. 2, the air guide kit section 30c will be described as representative of the air guide sections 30a, 30b and 30c. The air guide section 30c is shown in transverse cross section mounted adjacent the upper horizontal corner edge 26. The area of the bluff surface 18 adjacent the uppermost corner edge 26 thereof is shown as having a recess 32 formed therein which extends laterally across the top of the bluff surface 18 between the vertical corner edges 24 thereof. The recess 32 represents a surface irregularity in the bluff surface 18 as is often found adjacent windward corner edges of bluff vehicles. Such surface irregularity 32 would normally serve to inhibit smooth air flow about or around the upper corner edge 26 with a resultant increase in air drag on the vehicle. As used herein, the term "substantially right angle" is meant to include corner edges of bluff surfaces which may be defined by curved surfaces having radii of upwards of four inches, or may have some surface depression or irregularity therein, such as the recess 32, which may not form a true right angle corner edge.

The air guide kit 30c includes an air flow guide element 34 and an airvane element 36. The air flow guide element 34 has a generally inverted L-shaped cross sectional configuration which includes a downwardly depending portion 34a adapted to be secured to the bluff surface 18 in overlying relation thereto. The flow guide element 34 further has a rearwardly extending generally planar portion 34b which is mountable so as to engage the upper horizontal surface 22 of the trailer 16. The planar portion 34b extends longitudinally rearwardly from the corner edge 26 of the bluff surface 18 and forms a substantially right angle connection with the downwardly extending portion 34a through a small radius bend 34c which has a radius of curvature sufficient to control air flow over the surface of the flow guide element 34 within the flow guide kit section as will become more apparent hereinbelow.

The airvane element 36 of the air guide section 30c includes a forwardly disposed curved portion 36a and a rearwardly directed generally planar portion 36b formed integral with the curved portion 36a. The forward curved portion 36a has a concave curved transverse configuration relative to the air flow guide element 34 and is positioned forwardly of the depending portion 34a of the flow guide element 34. In the illustrated embodiment, the curved portion 36a of the airvane 36 is defined by an arcuate segment having an included angular extent of approximately 90°, the included angle being considered in the plane of FIG. 2 as the angle subtended between a vertical line passing through the center of the radius of curvature and a line passing through the center of curvature and the leading edge 36c of the airvane element 36. The angular extent of the curved portion 36a of the airvane element 36 is preferably limited to 90° or less.

The airvane element 36 is secured to the flow guide element 34 in fixed spaced relation therefrom by means of a plurality of bracket members, one of which is indicated at 38, and by a plurality of aerodynamic spacer members, one of which is indicated at 40. The bracket members 38 are each secured to the curved portion 36a of the airvane element 36 by vibration-roof rivets 42 and to the depending portion 34a of the flow guide element 34 by suitable vibration-proof fastener bolts 44. The fastener bolts 44 may further provide fastener means for securing the air guide kit 10 to the bluff body 12. To this end, the bolts 44 may extend through a flange portion 46 of the bracket 38, through suitable bolt holes in the flow guide element 34, and through suitable holes in a bolting plate 48 which is secured to the inner surface of the bluff surface 18 on the trailer body 16. The inner ends of the bolts 44 may be secured to the bolting plate 48 by threaded connection therewith.

The brackets 38 may be disposed in parallel spaced relation along the longitudinal length of the air guide section 30c to lie in planes perpendicular to the longitudinal axis of the air guide section 30c, or the brackets 38 may be canted to direct the air flow for optimum distribution around the edge 34c of the air guide 34.

The aerodynamic spacer members 40 are suitably secured to and between the trailing planar portions 34b and 36b, respectively, of the air guide element 34 and the airvane element 36 by fastener bolts 50 and 52. The bolts 50 are of sufficient length to extend through suitable holes in the upper roof 22 of the trailer 16 for securing the air guide section 30c to the trailer. The lower ends of the bolts 50 may be threadedly attached to a transverse bolt plate 54 secured to the inner surface of the roof 22. The spacer members 40 are disposed in parallel spaced relation longitudinally along the air guide section 30c and maintain the planar portion 36b of the airvane element 36 in parallel spaced relation to the planar portion 34b of the air flow guide element 34. For a standard size trailer 16 having a height of between 8-13 feet and a width of approximately 8 feet, the planar portion 36b of the airvane element 36 is maintained approximately 1 inch or about 2–3 cm. above the planar portion 34b of the flow guide element 34.

As will be seen in FIG. 2, the planar portions 34b and 36b of the air guide element 34 and airvane element 36, respectively, are spaced apart to define an air flow exit passage therebetween which has a smaller vertical height that the width of the air input passage defined between the leading edge 36c of the airvane element and the air guide element portion 34b. Air flowing through the air passage of the air guide 10 is thus contracted with a resultant increase in velocity of the air flow as it exits from the air guide. It has been found that spacinng the airvane element 36 and associated air guide element 34 so as to establish a contraction ratio of approximately 5.5 ± 0.5, considered with the air guide 10 moving at a forward relative ground speed of approximately 60 m.p.h., provides the desired increase in velocity of air flowing through the air guide 10 so that air separation from the associated longitudinally extending surface of the bluff body 12 after exiting from the air guide is substantially reduced and, in many cases, virtually eliminated. The contraction ratio $b/c$ is represented by the ratio of dimensions designated by the letters $b$ and $c$ in FIG. 2. As noted, the dimension $c$ is preferably maintained between approximately 2–3 cm. for a conventional size trailer 16.

While the described air guide section 30c may be employed individually along the upper windward horizontal edge 26 of the bluff vehicle 1 to reduce air drag on the vehicle, optimum air drag reduction is achieved when the air guide section 30c is used in combination with vertical air guide sections 30a and 30b. The air guide sections 30a and 30b are identical in transverse cross sectional configuration to the desired air guide section 30c and are secured to the forward bluff surface 18 and associated lateral side surfaces 20 to provide air passages through which air passes around the vertical windward corners 24 of the trailer 16. The longitudinal length of the air guide section 30c is made substantially equal to the lateral width of the upper corner edge 26 of the trailer 16. The air guide sections 30a and 30b preferably have longitudinal lengths sufficient to extend downwardly below the upper roof line of the tractor cab 14 but may extend the full height of the trailer. The opposite ends of the air guide section 30c are mitered for suitable close fitting association with mitered upper ends of the vertically disposed air guide sections 30a and 30b so as to form a generally inverted U-shaped air guide means for the trailer 16, as shown in FIG. 1.

With the air guide sections 30a, 30b and 30c comprising the air guide kit 10 as above described, air impinging against the forward bluff surface 18 of the trailer 16 as the trailer is moved in a forward direction will move generally radially outwardly from a central air stagnation point or area on the bluff surface 18 whereupon the air passes through the air guide sections 30a, 30b and 30c. The velocity of the air passing through the air guide kit sections is increased and the air is discharged through the outlet orifices defined between the trailing edges of the planar portions 34b and 36b of the flow guide elements 34 and airvane elements 36, respectively. The air leaving the discharge orifices of the air guide kit sections will flow along the associated longitudinally extending side and top surfaces 20 and 22, respectively, of the trailer 16. Efficient guiding of the flow around the corner will reduce the overall pressure on the forward bluff surface and with proper location of the air flow control elements also develop a net forward thrust, thereby reducing the air drag. Regions of turbulent air flow resulting from separation of the air streams from the side and top surfaces of a bluff vehicle as the air passes around the vertical and horizontal windward edges of the bluff surface, as has heretofore been experienced, are substantially eliminated and reduce side air turbulence and buffeting of the trailer 16. In the event of crosswinds, the air guide kit sections retain their drag reduction properties until extremely large cross-wind angles are encountered. Under the latter condition, separation on the leeward corner is still sinificantly reduced by the air guide kit section.

The air guide kit sections 30a, 30b and 30c may be constructed as individual unitary assemblies which may be readily installed on bluff vehicle, such as the trailer 16, by means of the mounting bolts 44, 50 and 52. It is desirable that an air guide kit section be mounted adjacent each of the windward vertical and upper horizontal corner edges of the bluff vehicle that have radii less than approximately 4 inches. Installation of either the upper air guide kit section 30c or a pair of vertical air guide kit sections 30a and 30b will also serve to reduce air drag on the associated bluff vehicle with economies being achieved through the reduction in power and fuel required to move the bluff vehicle.

The airvane element may alternatively be in the form of an airfoil section. One embodiment of such airfoil section is illustrated in FIG. 3. In this figure the airvane element which is indicated generally at 56, may be employed in conjunction with the aforedescribed flow guide element 34 in an air guide kit, or may be employed without an associated flow guide element as generally disclosed in the above referenced copending application of Jeffrey W. Kirsch and Sabodh K. Garg. The airvane element 56 included a curved leading portion 56a and a trailing generally planar portion 56b.

The trailing planar portion 56b of the airvane 56 is generally similar to the trailing planar portion 36b of the above described airvane 36 of the air guide means 10. The planar portion 56b of the airvane element 56 preferably has its trailing edge chamfered or beveled at 58. The leading curved portion 56a of the airvane 56 is defined by inner and outer surfaces 60 and 62, respectively, which form forward extensions from inner and outer surfaces of the trailing planar portion 56b of the airvane. The inner and outer surfaces 60 and 62, respectively, of the leading curved portion 56a of the airvane 56 diverge relative to each other, when considered from the trailing planar portion 56b toward a leading edge portion 64 of the forward curved portion 56a of the airvane.

As noted, the airvane 56 may be secured to a flow guide element 34 in the manner above described in respect to the air guide kit means 10. Alternatively, the airvane 56 may be secured to a bluff vehicle in overlying relation to a corner edge thereof by means as disclosed in the referenced copending application of Jeffrrey W. Kirsch and Sabodh K. Garg. It will be understood that the airvane 56 is given a longitudinal length equal to the length of a flow guide element 34 with which the airvane 56 may be used, or a longitudinal length as necessary to extend the desired distance along a corner edge of a bluff vehicle.

By forming the airvane 56 with the diverging inner and outer surfaces 60 and 62, respectively, and with the curved leading edge 64, an aerodynamically shaped airvane is provided which obtains smooth air flow at the leading edge of the airvane whereby to reduce air drag acting on the airvane itself.

Figure 4:
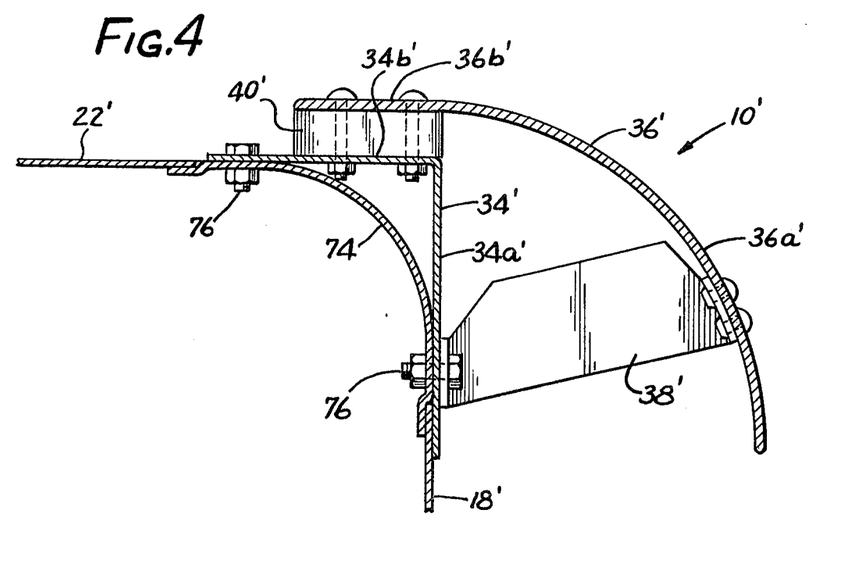
FIG. 4 is a partial transverse sectional view similar to FIG. 2 but showing an alternative embodiment of air drag reducing means in accordance with the present invention.

FIG. 4 illustrates an alternative embodiment of an air guide kit, indicated generally at 10', which finds particular application for use with bluff vehicles having rounded corner edges, particularly rounded upper horizontal and side vertical windward corner edges. As shown, a forward generally vertical bluff surface 18' is connected to a rearwardly extending top surface 22' of a bluff body, such as the trailer 16, through a curved corner member 74. The corner member 74 is connected to the forward surface 18' and the top surface 22' through suitable means such as bolts 76. The corner member 74 defines a rounded corner edge between the windward surface 18' and the top surface 22'.

The air guide kit 10' includes an inverted L-shaped flow guide element 34' which has a depending planar portion 34a' and a generally horizontal planar portion 34b'. An airvane element 36' is mounted in spaced relation on the flow guide element 34' through bracket members 38; and spacer members 40' in substantially identical fashion to the above described airvane 36. To compensate for the rounded corner 74, the planar portion 34b' is formed to extend rearwardly sufficiently beyond the spacer members 40' to provide an area for attachment by means of a bolt 76 to the corner member 74. In other respects, the air guide kit 10' is identical to the air guide kit 10.

Figure 5:
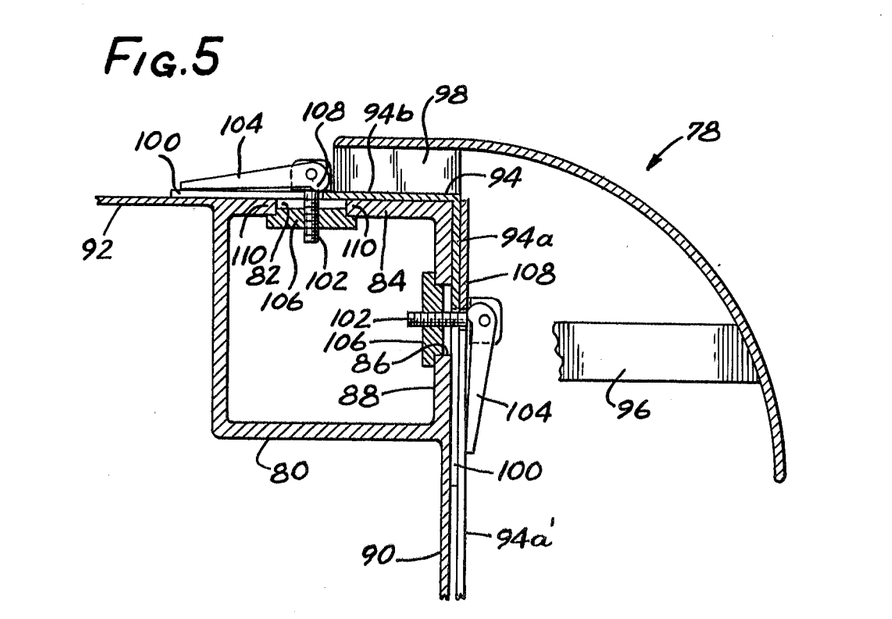
FIG. 5 is a partial transverse sectional view similar to FIG. 4 but showing an air guide kit in accordance with the present invention adapted for releasable mounting on a bluff vehicle or cargo container.

FIG. 5 illustrates a further modification of an air guide kit, indicated generally at 78, in accordance with the present invention for releasable mounting on a trailer or cargo container vehicle. In general, cargo containers are standardized to the extent that each corner consists of a heavy steel corner casting such as indicated at 80 in FIG. 5. The corner casting 80 is in the form of a hollow cube having an elongated hole in each of the three exposed faces. One such hole is shown at 82 in an upper surface 84 of the corner casting 80, and another such hole is shown at 86 in the front surface 88. These holes are generally used as lift and tie-down points to secure the detachable cargo container to a highway or rail transporter. The corner castings 80 are welded to adjacent forward windward vertical surfaces 90 and upper horizontal top surfaces 92 of the cargo container. Frequently, as with 20 foot long cargo containers, the cargo containers are secured to their associated highway or rail transporter by use of the bottom corner castings, leaving the side, front and top slots available for other functions.

The air guide kit 78 is adapted for releasable mounting on such corner castings 80 of a cargo container such that the air guide kit may be detached and stored when the cargo container on which it is used is off-loaded from a carrier transporter. To this end, the air guide kit 78 includes an inverted L-shaped air flow guide element 94 having a planar portion 94a for engagement with the forward surface 88 of the corner casting 80, and a planar portion 94b for engagement with the upper surface 84 of the corner casting. The flow guide element 94 has an airvane 36' secured thereto in spaced relation through brackets and spacers 96 and 98 is similar fashion to the above described air guide kit 10.

The planar portion 94b of the flow guide element 94 has an open ended slot 100 formed therein to receive a threaded toggle bolt 102. The toggle bolt 102 has a toggle arm 104 pivotally secured to its upper end and has a T-shaped nut 106 threadedly attached to its threaded lower end. The toggle arm 104 has a cam surface 108 thereon as shown. With the portion 94b of the flow guide 94 placed in closed proximity to the upper surface 84 of the corner casting 80, and with the slot 100 aligned with the opening 82 in the surface 84, the toggle bolt 102 may be placed in the slot 100 and the T-nut 106 inserted through the opening 82. It will be understood that the T-nut 106 must have a rectangular or other suitable shape to allow the T-nut to be inserted through the hole 82 and rotated such that edge surfaces 110 of the T-nut may be brought into engagement with the wall 84 adjacent the hole 82. The toggle bolt 102 is rotated about its axis to effect proper registration of the T-nut with the hole 82 and the toggle arm 104 pivoted to a position camming the surface 108 against the upper surface of the flow guide portion 94b. This locks the flow guide portion 94b against the casting 80.

The depending portion 94a of the flow guide 94 is similarly slotted at 112 to receive a toggle bolt 102 and T-nut 106 for securing the flow guide portion 94a to the forward surface 88 of the casting 80. It will be understood that provision is made at each end of the air guide kit 78 to secure the ends to the laterally spaced corner castings 80 on the cargo container. Similarly, air gide kits 78 may be mounted adjacent the vertical corner edges of the cargo container in the same manner as described in respect to FIG. 5. A portion of a vertical corner mounted air guide kit is shown at 94a' in FIG. 5 in overlying relation to the portion 94a of the horizontal upper air guide kit 78.

The airvane 56, as well as the aforedescribed air guide kit 10, may alternatively be made of suitable inexpensive disposable materials such as pressed paper, fiber or structural foam plastic of sufficient strength to withstand dynamic forces during use, but which can be economically disposed of after a single use if desired. Such a disposable airvane or air guide kit finds particular application when logistics require one-way transport of the associated bluff containers.

FIGS. 6–9 illustrate an alternative embodiment of air drag reducing means constructed in accordance with the present invention. The embodiment illustrated in FIGS. 6–9 finds particular application where it is necessary that height and width limits of the trailer or bluff vehicle, as set by law, not be exceeded. The embodiment of FIGS. 6–9 might therefore by considered a preferred design inasmuch as it can be readily used by commercial vehicles without special use permits.

The air drag reducing means illustrated in FIGS. 6–9 takes the form of an air guide kit, indicated generally at 120, which includes three air guide sections 120a, 120b and 120c. The air guide sections 120a, 120b and 120c are substantially identical in construction and are mounted on the bluff trailer 16 such that the air guide sections 120a and 120b are mounted adjacent the vertical generally square windward corner edges 24 while the air guide section 120c is mounted adjacent the upper horizontal windward corner edge 26. Preferably, the vertically mounted air guide sections 120a and 120b are used in combination with the upper horizontally disposed air guide section 120c, although it will be understood that either one or all of the air guide sections 120a, 120b and 120c may be mounted on the bluff vehicle 16 adjacent the windward corner edges 24 and 26 thereof and will serve to reduce air drag on the bluff vehicle.

If the space between the rear of the tractor cab 14 and the forward bluff surface 18 of trailer 16 is relatively large, then the vertical air guide sections 120a and 120b are preferably made to extend the full vertical height of the trailer. If the distance between the tractor cab 14 and trailer 16 is relatively short, the vertical air guide sections 120a and 120b may be made to extend from the upper horizontal windward edge 26 downwardly to approximately the level of the roof line of the tractor cab if the tractor cab aerodynamically shields the bottom portion of the trailer face.

Figures 6, 7:
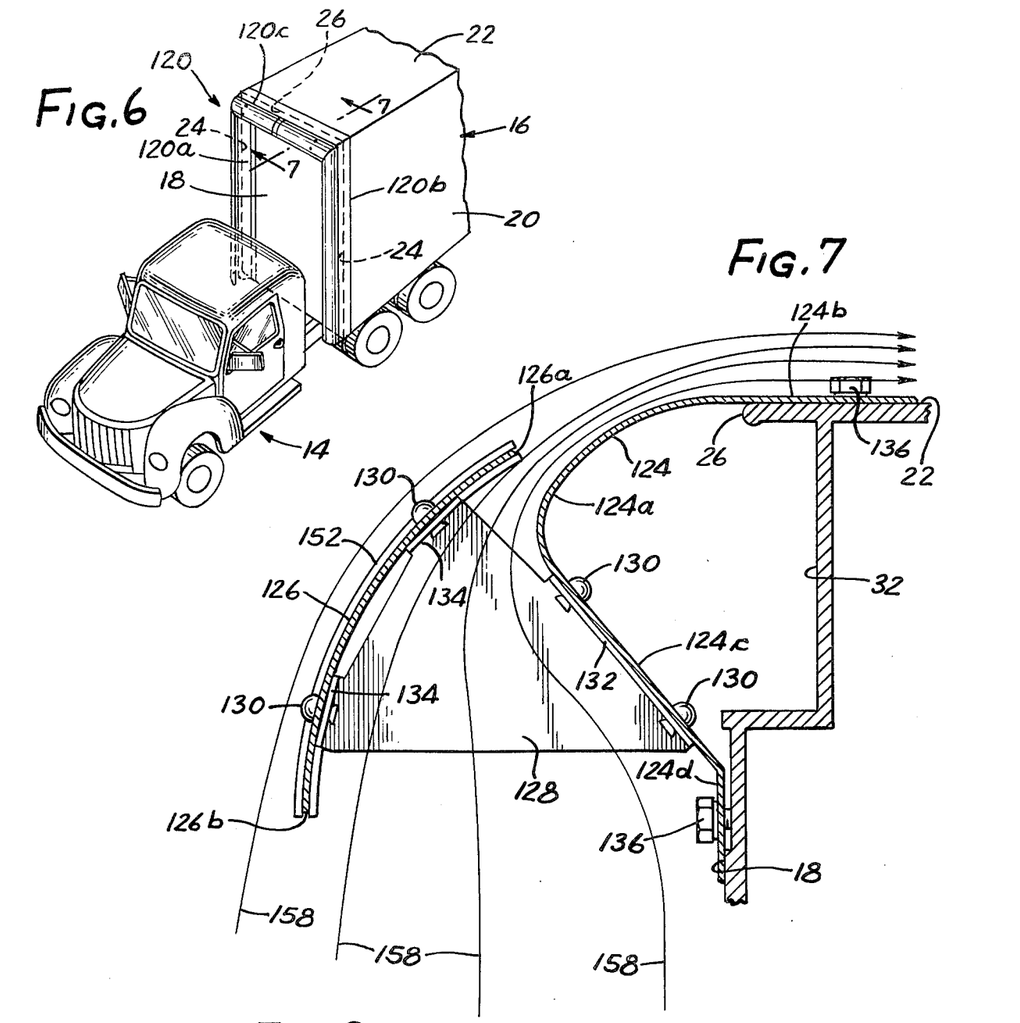
FIG. 6 is a partial perspective view of a bluff vehicle similar to FIG. 1 but having air drag reducing means in accordance with another embodiment of the present invention mounted adjacent the windward corners of the trailer.
FIG. 7 is a transverse sectional view taken substantially along the line 7—7 of FIG. 6.
Figures 8, 9:
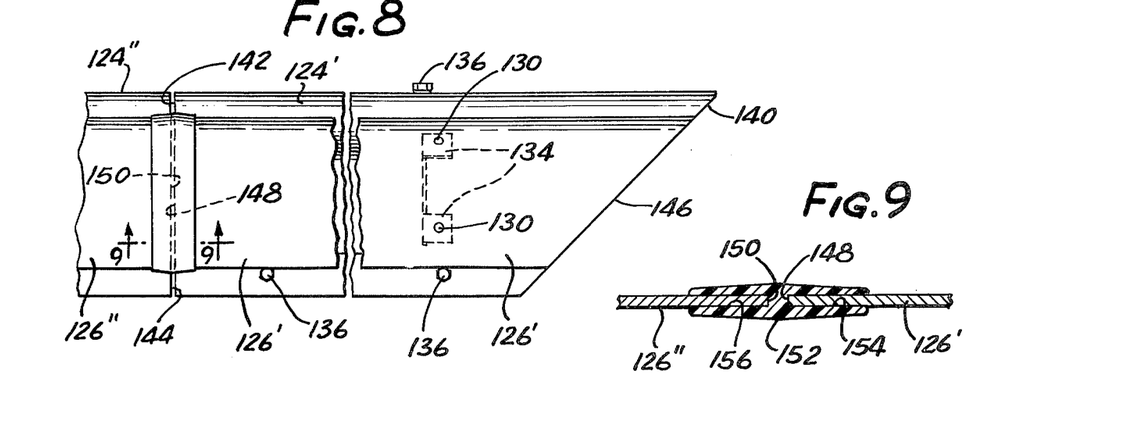
FIG. 8 is a partial foreshortened front elevational view of the upper horizontal air guide mounted on the trailer vehicle of FIG. 6.
FIG. 9 is a partial sectional view taken substantially along the line 9—9 of FIG. 8, looking in the direction of the arrows.

With particular reference to FIGS. 7–9, the air guide section 120c will be described in detail as exemplifying the structural design of the air guide sections 120a, 120b and 120c. The air guide section 120c includes an air flow guide element 124 and an airvane member 126. The air flow guide element 124 is adapted to be mounted adjacent the upper horizontal windward corner edge 26 of the trailer 16. As noted above in respect to FIG. 2, the area of the bluff surface 18 adjacent the upper transverse corner edge 26 may have a recess, such as indicated at 32 in FIG. 7, formed adjacent the upper corner edge 26 and extending transversely of the bluff surface. The recess 32 represents a deviation from an otherwise planar bluff surface 18 and would normally serve to inhibit smooth air flow around the upper corner edge 26 with a resultant increase in air drag on the trailer 16. The air flow guide element 124 is mounted on the trailer 16 adjacent the upper edge 26 so as to overlie the recess or surface irregularity 32 in the bluff surface.

The air flow guide element 124 includes a forwardly curved portion 124a which is concave relative to the bluff surface 18 and which terminates at its upper end in a generally planar portion 124b adapted to overlie the upper roof surface 22 of the trailer 16. The curved portion 124a of the flow guide element blends at its lower edge with an upwardly and outwardly inclined planar portion 124c which, in turn, terminates at its lower edge in a generally vertically disposed planar portion 124d. The planar portion 124d is adapted to engage and be secured to the bluff surface 18 below the recess 32. The air flow guide element 124 may be made of a suitable metallic sheet material or a suitable strength plastic or the like.

The airvane member 126 is also made of a suitable metallic, paperboard, or plastic sheet material and is formed into a smooth arcuate airfoil, when considered in transverse cross section as in FIG. 7. The airvane member 126 may be chamfered or beveled along both its upper and lower longitudinal edges 126a and 126b, respectively. The airvane member 126 is secured to the air flow guide element 124 in fixed spaced relation forwardly thereof by means of a plurality of bracket members, one of which is indicated at 128 in FIG. 7. The bracket members 128 are each secured to and between the airvane element 126 and the angularly inclined planar portion 124c of the air flow guide element 124 by vibration-proof rivets 130. To this end, each of the bracket members 128 has a right angled connected flange 132 which abuts and is secured to the planar portion 124c of the air flow guide element. Each bracket member 128 also has a pair of right angle tabs 134 which are secured to the airvane member 126. The bracket members 128 lie in planes normal to the longitudinal axes of the air flow guide element 124 and airvane member 126.

When in assembled relation as described, the air guide section 120c may be secured to the bluff vehicle 16 adjacent the upper windward corner edge 26 thereof by bolts 136 received through suitable openings in the upper planar portion 124b and lower planar portion 124d of the air flow guide element 124. Conventional rivet-nuts are particularly suitable for attaching the air guide sections to the bluff vehicle 16.

With reference to FIG. 8, both the air flow guide element 124 and the airvane member 126 may be made of separate segment lengths which are connected end-to-end in a manner to extend the full length of the windward edge 26 of the trailer 16. To this end, the air flow guide element 124 may be formed to include a right-hand segment 124' having a 45° mitered right-hand end edge 140 and an opposite square end edge 142. The right-hand flow guide segment 124' is connected to a second or left-hand flow guide segment 124" which may constitute a mirror image of the segment 124' or may comprise an intermediate length segment which has a squared end edge 144 positioned adjacent the squared end 142 of the segment 124'.

Similarly, the airvane member 126 may comprise one or more segment lengths, two of which are indicated at 126' and 126" in FIG. 8. The right-hand segment 126' has an outer 45° mitered edge 146 and an opposite squared end edge 148. The segment 126" has a squared end edge 150 positioned adjacent the edge 148 of the airvane segment 126'. The opposite end of the airvane segment 126" may be mitered, if the segment 126" forms one-half the airvane member 126, or may be a squared end if the segment 126" comprises an intermediate length of the airvane member. Suitable means are employed to connect, respectively, the adjacent ends of the air flow guide element segments 124' and 124", and the airvane segments 126' and 126". In the illustrated embodiment, a connector member 152 made from plastic or other suitable material is provided having grooves or slots 154 and 156 (FIG. 9) to receive the opposing edges 148 and 150 of the airvane segments 126' and 126", respectively. The connector member 152 has a longitudinal length equal to the arcuate widths of the associated airvane segments 126' and 126" and serves to retain their adjacent ends in assembled relation. A similar connector member may be employed in conjunction with retaining the adjacent ends of the air flow guide segments 124' and 124".

The mitered end edges 140 and 146 on the air flow guide element 124' and airvane element 126', respectively, are cooperable with similarly mitered end edges on the air flow guide element and airvane member of the vertical air guide kit section 120b when mounted on the trailer 16. Similarly, the vertical air guide kit section 120a would have the upper edges of its associated air flow guide element and airvane member mitered for cooperation with the adjacent end of the air guide kit section 120c. It will be appreciated that if the vertical air guide kit sections 120a and 120b are not employed in combination with the upper horizontal air guide kit section 120c, the opposite ends of the upper air guide kit section 120c need not be mitered.

In one embodiment of the air guide kit 120 for mounting on a trailer having a vertical height of approximately 13 ft. 6 in. and a width of approximately 8 ft., the airvane element 126 is formed as an arcuate segment having a radius of approximately 6 inches and an arcuate extent of 60°, when considered in transverse cross section as in FIG. 7. The planar portion 124c of the air flow guide element 124 is inclined at an angle of approximately 40° from the plane of portion 124d. The curved portion 124a is formed with a compound arcuate curvature defined by a first lower portion having a radius of approximately 1 inch and a second upper portion having a radius of approximately 3 inches. The upper curved portion terminates in the planar portion 124b which extends rearwardly approximately 2.75 inches. The brackets 128 are of sufficient size and configuration to space the airvane member 126 forwardly from the air flow guide element 124 such that the lower edge 126b of the airvane member is spaced approximately 6 inches from the planar portion 124d of the air flow guide element 124, while th upper edge 126a of the airvane member is spaced from the opposing curved surface 124a of the air flow guide element a distance of approximately 0.70 inches.

With the air guide kit 120 including the air guide sections 120a, 120b and 120c mounted on a bluff vehicle such as the illustrated trailer 16, the airvane members 126 of the air guide sections do not protrude outwardly of an envelope defined by the planes of the upper surface 22 and side surfaces 20 of the trailer 16. The non-protruding air guide sections serve to reduce air drag on the trailer 16 by reducing the overall pressure on the forward bluff surface 18 of the trailer 16 and simultaneously develop a net aerodynamic forward thrust acting on the air guide sections. Air passing from the bluff surface 18 will generally follow air flow lines as illustrated at 158 in FIG. 7. It can be seen that the air flow through the air guide sections flows smoothly through the discharge passages defined between the outer edges 126a of the airvane members 126 and the opposing outer convex surfaces 124a of the air flow guide elements 124, whereafter the air maintains smooth attached flow over the adjacent outer exposed surfaces of the air flow guide elements and passes rearwardly along the adjacent corresponding upper and side surfaces 22 and 20 of the trailer 16.

In accordance with the embodiment of the invention illustrated in FIGS. 6–9, air ejected from the converging nozzles defined by the airvane members 126 and associated air flow guide elements 124 has a transverse velocity component (relative to the longitudinal axis of trailer 16) which is sufficiently reduced by dilution with the air streams flowing over the convex surfaces of the airvane members and the free, unperturbed air such that the flow remains attached to the side and top surfaces of the trailer body. It is the reduction in the overall pressure acting against the bluff surface 18, the development of a net forward thrust on the air flow guide elements, and the attachment of air passing rearwardly from the bluff surface 18 after passing through the air guide kit sections that serves to substantially reduce air drag on the vehicle.

While the air drag reducing means illustrated in FIGS. 6–9 has been described as comprising an air guide kit 120 which includes both the air flow guide element 124 and the airvane member 126, it is contemplated that a bluff vehicle upon which the air drag reducing means of the present invention may be mounted could have fairing surfaces formed thereon adjacent the windward corner edges during initial manufacture. For example, fairing surfaces taking the form of arcuate surfaces or taking the form of the described air flow guide element 124 may be provided on a bluff vehicle adjacent its windward corner edges during initial manufacture of the vehicle. In such cases, airvane members 126 and associated bracket members 128 may be secured to the fairing surfaces formed on the bluff vehicle in substantially the same manner in which the airvane member 126 is secured to the flow guide element 124 in FIG. 7.

It will be appreciated that the airvane member 126 shown in FIG. 7 may take substantially the form of the airvane 56 illustrated in FIG. 3. In employing an airvane of the configuration shown in FIG. 3 with an air flow guide element such as 124 to provide a non-protruding air guide for use on a bluff vehicle, the airvane 56 would be modified so that it has an arcuate extend of approximately 60°, considered as the included angle between the leading edge 64 and a relatively sharp trailing edge. This would entail elimination of the trailing planar portion 56b of the airvane 56 so that the trailing edge defines the upper edge of the arcuate airvane.

While various embodiments of the air drag reducing means of the present invention have been illustrated and described, it will be understood to those skilled in the art that changes and modifications may be made therein without departing from the invention in its broader aspects. Various features of the invention are set forth in the following claims.

What is claimed is:

1. Means for reducing air drag on a bluff vehicle having a forward generally vertically disposed bluff surface against which air impinges when the vehicle is moved in a forward direction, said bluff surface intersecting longitudinally rearwardly extending top and lateral surfaces to define upper horizontal and side vertical substantially right angle corner edges, the air impinging said bluff surface forming an air stagnation area from which the air passes radially outwardly around said corner edges, said air drag reducing means comprising, in combination, an airvane member having a generally arcuate transverse configuration defining an inner concave surface and an outer convex surface, an air flow guide element adapted to be mounted on said vehicle adjacent at least one of said right angle corner edges and having a length substantially equal to the length of said airvane, said air flow guide element defining an outer convex curvature extending forwardly of said bluff surface and substantially disposed within an envelope defined by the planes of said longitudinally rearwardly extending top and lateral surfaces of the vehicle when said air flow guide element is mounted thereon, and means securing said airvane member in spaced relation to said air flow guide element so that said inner concave surface faces said air flow guide element and a leading edge of said airvane member is disposed within said envelope when said air flow guide element is mounted on said vehicle, said airvane member also having a trailing edge and cooperating with said air flow guide element to define a rearwardly converging air flow passage therebetween having air entrance and exit areas extending the full length of said airvane member and air flow guide element, said air passage being adapted to receive air passing from said bluff surface and cause air passing through said air flow passage to increase in velocity and be maintained in attached relation to the longitudinally rearwardly extending surface of the vehicle leeward of said trailing edge of said airvane member and provide a net forward thrust on said air drag reducing means.

2. Means for reducing air drag as defined in claim 1 wherein said arivane member has an arcuate extent of approximately 60°, considered as the angle subtended by the radius of curvature between the leading edge and the trailing edge thereof.

3. Means for reducing air drag on a bluff vehicle as defined in claim 1 wherein said means securing said airvane member in spaced relation to said air flow guide element includes a plurality of generally planar support brackets secured to and between said airvane member and said air flow guide element, said support brackets being disposed in spaced substantially parallel relation.

4. Means for reducing air drag on a bluff vehicle as defined in claim 1 wherein said air flow guide element has a first portion adapted to be secured to the bluff surface, said first portion being connected to a second generally planar portion extending angularly outwardly and forwardly of said first portion when mounted on said bluff vehicle, said second portion being connected to an upper substantially planar third portion through a generally arcuately curved portion defining an external convex surface relative to said bluff surface when said air flow guide element is mounted on said vehicle.

5. A device for use in reducing air drag on a bluff vehicle having a generally vertical forward bluff surface intersecting longitudinally rearwardly extending top and side surfaces to define, respectively, substantially right angle upper horizontal and vertical side windward corner edges, said bluff surface having a configuration such that air impinging against said bluff surface flows toward and around said upper and side windward corner edges, said device comprising an airvane member having a leading edge and a trailing edge interconnected by a forward convex surface and a rearward concave surface, an air flow guide member adapted for mounting on the bluff vehicle adjacent at least one of said horizontal and vertical corner edges, said air flow guide member having a forwardly directed surface portion adapted to form a fairing over said adjacent corner edge when said air flow guide member is mounted on said bluff vehicle, said airvane member and said air flow guide member having substantially equal longitudinal lengths sufficient to extend substantially the length of said one of said horizontal and vertical side corner edges, means affixing said airvane member to said air flow guide member such that when said air flow guide member is mounted on said vehicle adjacent said corner edge said airvane member is disposed within an envelope defined by the planes of said longitudinally rearwardly extending top and side surfaces, said airvane member defining with said air flow guide member a rearwardly converging aerodynamic air flow passage such that air passing from said bluff surface through said air flow passage is caused to flow along said adjacent longitudinally extending surface without separating therefrom leeward of said airvane member and provide a net forward thrust on said air drag reducing device.

6. A device as defined in claim 5 wherein said mounting bracket means includes a plurality of support brackets lying in parallel spaced planes disposed generally transverse to the longitudinal axis of said airvane means.

7. A device as defined in claim 5 wherein said airvane means includes an airvane member having a generally arcuate transverse cross-sectional configuration with an arcuate extent of approximately 60°, considered as the angle subtended by the radius of curvature between the leading and trailing edges of said airvane member.

8. In a bluff vehicle having a forward bluff surface against which air impinges when the vehicle is moved in a forward direction, said bluff surface interconnecting to a longitudinally rearwardly extending surface of the vehicle through a fairing surface forming a smooth curved corner edge over which air will flow in passing from said bluff surface leeward along said rearwardly extending surface, the combination therewith comprising airvane means including an airvane member defining a substantially arcuate air foil transverse configuration, and means mounting said airvane member on said vehicle in forwardly spaced relation to said fairing surface, said airvane member having a leading edge spaced forwardly from said bluff surface a first distance and having a trailing edge spaced forwardly from the forwardmost surface region of said fairing surface a second distance less than said first distance, said airvane member and said fairing surface defining an air flow passage therebetween through which air passes after impingement with said bluff surface, said air passage converging in the direction of air flow therethrough such that air passing through said air passage will flow rearwardly along said rearwardly extending surface without separation therefrom leeward of said trailing edge of said airvane member and provide a net forward thrust on the airvane and related fairing surface.

9. The combination of claim 8 wherein said fairing surface includes an outwardly convex surface portion which does not extend substantially outwardly beyond an envelope defined by the plane of said longitudinally rearwardly extending surface of said vehicle, said airvane member having its trailing edge spaced forwardly from said convex surface portion of said fairing and defining therewith an exit opening through which air passes from said bluff surface when said vehicle is moved in a forward direction.

10. The combination as defined in claim 8 wherein said airvane member has an arucate transverse curvature having an included angular extent of approximately 60°.

11. The combination as defined in claim 8 wherein said trailing edge of said airvane member is disposed within an envelope defined by the plane of said rearwardly extending surface of said vehicle.

12. Air guide means for use with a bluff vehicle having a forward generally vertical planar bluff surface intersecting side and top rearwardly extending longitudinal surfaces, said air guide means being adapted for mounting adjacent a windward substantially right angle corner edge defined by the intersection of said forward generally vertical planar bluff surface with one of said rearward longitudinal surfaces on the vehicle, said air guide means including an air flow guide element having a first portion adapted to be secured to the vehicle in a position to overlie a portion of said bluff surface adjacent said windward corner edge thereof so as to cover any surface irregularities in said bluff surface adjacent said windward corner edge, said air flow guide element having a second portion adapted to extend rearwardly from said bluff surface in overlying contacting relation with said rearward surface of the vehicle, an airvane member having a length substantially equal to said air flow guide element and having a forward curved portion, and means securing said airvane member to said flow guide element in spaced apart relation, said airvane member having its forward curved portion spaced outwardly from and in concabe relation to said first portion of said flow guide element so that a leading edge of said forward curved portion is located forwardly of said bluff surface and within an envelope defined by the planes of the longitudinal surfaces of the vehicle, said air flow guide element and said airvane member cooperating to define a rearwardly converging air passage therebetween which extends the full length of said air flow guide element and through which air will flow smoothly around said corner edge from said bluff surface in a manner to substantially reduce air separation from said rearward longitudinal surface on the vehicle and provide a net forward thrust on said air guide means.

13. Air guide means as defined in claim 12 wherein said airvane member has a rearward generally planar portion disposed in spaced overlying relation to said rearwardly extending second portion of said flow guide element.

14. Air guide means as defined in claim 13 wherein said means securing said airvane member to said flow guide element includes a plurality of air flow straightener brackets secured to and between said curved portion of said airvane member and said first portion of said flow guide element, said air straightener brackets being disposed in generally parallel relation to each other and being adapted to assist in the optimum distribution of air through the air guide means.

15. Air guide means as defined in claim 14 wherein said means securing said airvane member to said flow guide element further includes a plurality of aerodynamic spacer elements secured to and between said second portion of said flow guide element and said planar portion of said airvane member, said spacer elements being planar and disposed in generally parallel spaced relation to assist in the uniform distribution of air as it passes through the air guide means.

* * * * *

UNITED STATES PATENT AND TRADEMARK OFFICE
CERTIFICATE OF CORRECTION

PATENT NO.   : 4,022,508
DATED        : May 10, 1977
INVENTOR(S)  : Jeffrey W. Kirsch, et al It is certified that error appears in the above-identified patent and that said Letters Patent are hereby corrected as shown below:

| | | |
|---|---|---|
| Col. 1, line 5 | "ivention" should be | --invention--. |
| Col. 1, line 44 | "vehicle" should be | --vehicles--. |
| Col. 1, line 60 | "widward" should be | --windward--. |
| Col. 4, line 16 | "sirfaces" should be | --surfaces--. |
| Col. 6, line 17 | "vibration-roof" should be | --vibration-proof--. |
| Col. 6, line 60 | "that" should be | --than--. |
| Col. 6, line 66 | "spacinng" should be | --spacing--. |
| Col. 7, line 14 | "vehicle 1" should be | --vehicle 12--. |
| Col. 7, line 66 | "sinificantly" should be | --significantly--. |
| Col. 8, line 1 | "vehicle" should be | --vehicles--. |
| Col. 8, line 43 | "edgge" should be | --edge--. |
| Col. 8, line 44 | "Jeffrrey" should be | --Jeffrey--. |
| Col. 9, line 47 | "is" should be | --in--. |
| Col. 9, line 56 | "closed" should be | --close--. |
| Col. 10, line 11 | "gide" should be | --guide--. |
| Col. 12, line 65 | "th" should be | --the--. |

UNITED STATES PATENT AND TRADEMARK OFFICE
CERTIFICATE OF CORRECTION

PATENT NO. : 4,022,508
DATED : May 10, 1977
INVENTOR(S) : Jeffrey W. Kirsch, et al It is certified that error appears in the above–identified patent and that said Letters Patent are hereby corrected as shown below:

| | |
|---|---|
| Col. 13, line 64 | "extend" should be --extent--. |
| Col. 14, line 52 (Claim 2) | "arivane" should be --airvane--. |
| Col. 16, line 34 (Claim 12) | "rearward" should be --rewardly--. |
| Col. 16, line 49 | "concabe" should be --concave--. |

Signed and Sealed this

Twentieth Day of December 1977

[SEAL]

Attest:

RUTH C. MASON
Attesting Officer

LUTRELLE F. PARKER
Acting Commissioner of Patents and Trademarks